United States Patent [19]

Simons

[11] 4,111,909

[45] Sep. 5, 1978

[54] CONTROLLED REACTIVITY EPOXY RESIN COMPOSITIONS

[75] Inventor: James Brandon Simons, Louisville, Ky.

[73] Assignee: Celanese Polymer Specialties Company, Louisville, Ky.

[21] Appl. No.: 786,178

[22] Filed: Apr. 11, 1977

[51] Int. Cl.$^2$ .............................................. C08G 59/56
[52] U.S. Cl. ..................................... 528/123; 528/89; 528/404; 528/408; 528/418; 260/830 R
[58] Field of Search .......... 260/47 EC, 47 EN, 2 EC, 260/2 N, 45.7 PH

[56] References Cited

U.S. PATENT DOCUMENTS

| | | | |
|---|---|---|---|
| 3,310,503 | 3/1967 | Huwyler et al. | 260/2 |
| 3,631,150 | 12/1971 | Green | 260/47 EN |
| 3,637,591 | 1/1972 | Coran | 260/47 EC |
| 3,703,496 | 11/1972 | Hodan et al. | 260/47 EC |
| 3,728,302 | 4/1973 | Helm | 260/37 EP |
| 3,801,348 | 4/1974 | Helm | 117/21 |

Primary Examiner—Harold D. Anderson
Assistant Examiner—E. A. Nielsen
Attorney, Agent, or Firm—Herbert P. Price; K. A. Genoni; T. J. Morgan

[57] ABSTRACT

Epoxy resin compositions having extended reactivity (gel time) are prepared by adding phosphate or phosphite compounds to epoxy resin-dicyandiamide-tertiary amine curing systems. Such compositions are useful in preparing glass fiber laminates and powder coatings.

11 Claims, No Drawings

CONTROLLED REACTIVITY EPOXY RESIN COMPOSITIONS

BACKGROUND OF THE INVENTION

The field of art to which this invention pertains is compositions having more than one 1,2-epoxy group plus curing agents.

Dicyandiamide is a well known curing agent for epoxy resins. It is essentially non-reactive with epoxy resins at room temperature but breaks down at elevated temperatures to cure the resins. The mixture of epoxy resin and dicyandiamide must be heated to a temperature of about 165° C. and held at this temperature for an extended period of time to effect a cure. The rate of cure increases with temperature. Various catalyst, e.g., tertiary amines, have been used with dicyandiamide to lower the curing temperature and to increase the cure rate. In U.S. Pat. No. 2,928,811, quaternary ammonium salts are disclosed as being useful accelerators for epoxy resin-dicyandiamide reactions. Other accelerators are acyl guanidines and metallic salts of polyamines, disclosed, respectively, in U.S. Pat. Nos. 3,397,156 and 3,397,157.

In some instances, particularly on production lines, the cure rate of epoxy resins with dicyandiamide with no accelerator is too slow for efficient operation, whereas the accelerated curing systems are too fast. Insufficient time is allowed to adjust resin flow and substrate wetting.

U.S. Pat. No. 3,079,418 discloses compositions made from haloalkyl phosphoric acid esters in admixture with epoxy resins. The epoxy resin is present in the composition in the amount of 0.1 to 10 percent by weight and serves as a stabilizer against decomposition of the haloalkyl phosphoric acid ester. U.S. Pat. No. 3,477,982 describes the use of red phosphorus in epoxy resin compositions for flame proofing. In U.S. Pat. No. 3,372,208, flame resistant epoxy resins are made by reacting an epoxy resin with a phosphorus trihalide. None of these references disclose curing systems made by adding phosphorus compounds to an epoxy resin-dicyandiamide-tertiary amine composition.

SUMMARY OF THE INVENTION

This invention pertains to heat curable epoxy resin compositions. In particular, this invention relates to heat curable epoxy resin compositions made from epoxy resins, dicyandiamide, tertiary amines and phosphorus compounds. In another aspect this invention pertains to a process for controlling the reactivity of heat curable epoxy resin compositions through the addition of phosphorus compounds.

By this invention heat curable epoxy resin compositions are made from glycidyl polyethers of polyhydric phenols or polyhydric alcohols, dicyandiamide and a tertiary amine plus a phosphorus compound. The phosphorus compound is represented by the formulas $R_3PO_4$ and $R_3PO_3$ wherein each R, separately or combined, is hydrogen, or an alkyl, aryl or haloalkyl radical. The alkyl group contains from 1 to 20 carbon atoms and the aryl groups contains 6 to 18 carbon atoms. The amount of phosphorus compound present in the composition is from about 0.1 to about 2 weight percent based on the weight of the glycidyl polyether.

By this invention through the use of various phosphorus compounds in various amounts, the reactivity of the heat curable epoxy resin compositions can be modified to obtain longer or shorter curing times. This control of reactivity is particularly important in the laminating field and in the powder coating field. In some laminating operations, glass cloth is passed through a solution of the resin and is then passed through a heated zone wherein the temperature is sufficient to flash off the solvent but insufficient to cure the resin. The resin coated glass cloth is then cut into sections which are then placed in a heated press, pressure is applied and a cured laminate is obtained. If the resin cures too fast, there will be flaws in the laminate due to insufficient flow of the resin and improper wetting of the glass fibers. If the resin cures too slowly, the heated fluid resin will flow off the glass cloth and will be unevenly distributed throughout the laminate.

In the powder coating field, solid particles of a heat curable powder are electrostatically sprayed onto a substrate and are then heated to melt the powder, to coalesce it and to cure it. The rate of gelation and cure must be such that sufficient flow is obtained for flow and leveling without getting sagging and run-off.

In epoxy resin-dicyandiamide compositions, the rate of cure can be regulated to some extent by increasing or decreasing the amount of dicyandiamide, by choice of accelerators or by the amount of accelerators. However, varying too far from preferred ranges of dicyandiamide and accelerator results in products which have decreased cross-links, lower heat distortion and inferior chemical and physical properties. By this invention the reactivity or gelation rate can be controlled without affecting the properties of the cured product.

DESCRIPTION OF THE INVENTION

The epoxy resins used in this invention are glycidyl polyethers of polyhydric alcohols and polyhydric phenols, such polyethers being derived from epihalohydrins and polyhydric alcohols or polyhydric phenols. The description and preparation of glycidyl polyethers can be found in U.S. Pat. Nos. 2,467,171, 2,615,007, 2,615,008, 2,801,227, 2,538,072 and 3,033,803, which are hereby incorporated by reference. Examples of polyhydric alcohols and polyhydric phenols from which the glycidyl polyethers are derived are ethylene glycol, propylene glycol, 1,4-butanediol, castor oil, trimethylolpropane, pentaerythritol, resorcinol, dihydroxynaphthalene, bis(4-hydroxyphenyl), bis(4-hydroxyphenyl)sulfone, bis(4-hydroxyphenyl)methane, 1,1-bis(hydroxyphenyl)ethane, 2,2'-bis(4-hydroxyphenyl) propane, commonly called Bisphenol A, 2,2'-bis(3,5-dibromo, 4-hydroxyphenyl)propane, and novolak resins derived from phenols and aldehydes. Useful epoxy resins have more than one 1,2-epoxy group per molecule and have epoxide equivalent weights of from about 100 to about 6000. Preferred epoxy resins have epoxide equivalent weights of from about 170 to about 2000.

The curing agent for the epoxy resin as used in this invention is dicyandiamide also referred to as cyanoguanidine. Dicyandiamide is mixed with the epoxy resin in the amount of about 1 to about 10 parts by weight per 100 parts by weight of the epoxy resin. Preferably, the dicyandiamide is utilized in the amount of about 3 to about 5 parts by weight per 100 parts by weight of the epoxy resin.

Accelerators used in this invention are tertiary amines, i.e., amines having the formula $R_3N$ wherein each R is the same or different and wherein R is an alkyl group, aryl group or arylalkyl group containing from 1 to 10 carbon atoms. Examples of useful tertiary amines are triethylamine, tripropylamine, tributylamine, benzyldimethylamine, phenyldimethylamine, dimethyloctylamine, and the like. Such tertiary amines are used in the amount of about 0.1 to about 1 part by weight per 100 parts by weight of the epoxy resin and, preferably, about 0.2 to about 0.3 part by weight.

The phosphorus compounds useful in this invention are phosphite and phosphate compounds represented by the formulas $$R_3PO_3 \text{ and } R_3PO_4$$

wherein each R, separately or combined, is hydrogen, or an alkyl, aryl or haloalkyl radical. The alkyl group contains from 1 to about 20 carbon atoms, the aryl group contains 6 to about 18 carbon atoms and the halogroups are chlorine, bromine and iodine. Examples of useful phosphorus compounds are phosphorous acid, dibutyl hydrogen phosphite, butyl, dihydrogen phosphite, triphenyl phosphite, phosphoric acid, tris(2,3-dibromopropyl)phosphate, butyl dihydrogen phosphate, dibutyl hydrogen phosphate, triethyl phosphate, and triethyl phosphite, i.e., phosphorous and phosphoric acids and organic esters of the acids. The trialkyl or aryl phosphites and phosphates are preferred, since such compounds are more compatible than the acidic compositions. However, acid compounds, e.g., phosphoric acid, can be prereacted with the epoxy resin to obtain compatibility. The amount of phosphorus compound used in this invention will vary from about 0.1 to about 2 parts by weight per 100 parts of epoxy resin and preferably, from about 0.1 to about 1.0 part by weight.

The compositions of this invention are useful wherever cured epoxy resins are used. They are particularly useful as laminating resins for glass fibers and cloth, in molding powders and in powder coatings. The compositions are generally cured at temperatures within the range of about 149° to about 205° C. at times of about 200 seconds to about 12 minutes. Preferred ranges are 165° to 175° C. for 300 to 500 seconds.

The invention is described in detail in the following examples. Parts and percentages, unless otherwise expressed, are parts and percentages by weight.

EXAMPLE 1

To a suitable reactor were added 1002 parts of the diglycidyl ether of Bisphenol A having an epoxide equivalent weight of 190. Heat was applied, nitrogen gas was bubbled through the resin, and agitation was begun. When the temperature of the resin reached 121° C., 969 parts of tetrabromobisphenol A [2,2'-bis(3,5-dibromo, 4 hydroxyphenyl)propane] and 1 part of triphenyl phosphine were added to the reactor. The temperature was then raised to 166° C., the heat source was removed and the reactants were allowed to exotherm to a maximum temperature of 204° C. The temperature was allowed to drop to 177° C. and was held at this temperature for about 2 hours. 1029 Parts of the diglycidyl ether of Bisphenol A were then added and the reactants were cooled to 121° C. Acetone, 750 parts, was slowly added over a 15 minute period while the temperature dropped to 66° C. The resulting resin solution, after filtering through a common sense filter had a solids content of 80%, a Gardner-Holdt viscosity of V-W at 25° C. and an epoxide equivalent weight, on solids basis, of 408.

The curing catalyst solution was made by dissolving 4 parts of dicyandiamide in 44 parts of ethylene glycol monoethyl ether plus 0.22 part of benzyldimethylamine. 24.15 parts of the catalyst solution were added to 62.97 parts of the resin solution. After standing for 6 hours at room temperature, the time to cure, referred to as the stroke cure, was determined by placing an amount of the resin-catalyst solution sufficient to form a puddle about the size of a nickel on a cure plate heated at 340° F. (171° C.), and stroking the resin with a wooden tongue depressor while the resin passed from a stringy, to a tacky, to a gummy cure state. The stroke cure time at 340° F. was 209 to 220 seconds. A number of phosphorus compounds at 50% nonvolatiles in acetone were added to the resin catalyst solution in the amount of 1% by weight based on the weight of epoxy resin in the resin catalyst solution. The stroke cure time at 340° F. was then determined. The phosphorus compounds and stroke cure times are listed in Table I.

Table I

| Phosphorus Compound | Cure Time sec. | Compatibility |
|---|---|---|
| Triphenyl Phosphate | 415 | Excellent |
| Tris (2,3-dibromopropyl)Phosphate | >720 | Excellent |
| Butyl Acid Phosphate* | 560 | Excellent |

*A equi-molar mixture of dibutyl hydrogen phosphate and butyl dihydrogen phosphate.

Additional phosphorous compounds were tested with the results as listed in Table II.

Table II

| Phosphorus Compound | Cure Time sec. | Compatibility |
|---|---|---|
| Sodium Hypophosphite Na H₂ PO₂ | 275 | Excellent |
| Sodium Dihydrogen Phosphate | 540 | Crystallized from solution |
| Dimethyl Acid Pyrophosphate | Could not determine | Not compatible and crystallized badly |
| Potassium Butyl Phosphate** | 225 | Excellent |
| Phosphoric Acid | 600 | Heavy crystallization |
| Triphenyl Phosphite*** | 345 | Excellent |

**Potassium salt of an equi-molar mixture of dibutyl hydrogen phosphate and butyl dihydrogen phosphate.
***0.75 weight % based on weight of epoxy resin.

EXAMPLE 2

To a suitable reactor were added 584.1 parts of the diglycidyl ether of Bisphenol A having an epoxide equivalent weight of 190. A nitrogen gas sparge through the resin was begun and heat was applied raising the temperature to 171° C. At this temperature 155.3 parts of Bisphenol A and 0.12 part of a 45% solution of potassium hydroxide in water were added. The temperature was raised to 163° C. at which point the reaction became exothermic with the temperature rising to about 205° C. When the exotherm was over, the temperature was reduced to 163° C. and was held at this temperature until a check-cut of the reactants had a Gardner-Holdt viscosity of D-E at 40% nonvolatiles in diethylene glycol monobutyl ether. The reactants were cooled while 194.6 parts of acetone were slowly added. After all the acetone was in and complete solution was obtained, 4.44 parts of tris(2,3-dibromopropyl)phosphate were added. After stirring at a temperature of 53° C. for 1 hour, the resin solution was filtered and stored. The resin solution at 80% nonvolatiles had a Gardner-Holdt viscosity of $Z-Z_1$ at 25° C. The epoxide equivalent weight was 490 on solids basis.

To 62.97 parts of the resin solution were added 24.15 parts of a solution made from 4 parts of dicyandiamide and 0.3 part of benzyldimethylamine in 44 parts of ethylene glycol monoethyl ether. The resin-curing agent solution was left at room temperature for 6 hours. The stroke cure time at 340° F. (171° C.) was found to be 385 to 420 seconds.

EXAMPLE 3

To a suitable reactor were added 274 parts of the diglycidyl ether of Bisphenol A. A nitrogen sparge was introduced through the resin, agitation was begun and heat was applied raising the temperature to 171° C. 264.9 Parts of 2,2'-bis(3,5-dibromo, 4-hydroxyphenyl)-propane and 0.275 part of triphenyl phosphine were added and the temperature was raised to 166° C. At this point, an exothermic reaction began raising the temperature to 215° C. When the exotherm had subsided, the temperature was lined out at 195° C. The temperature was held at 193° C. to 198° C. until a Gardner-Holdt viscosity of I-J at 25° C., measured at 40% nonvolatiles in diethylene glycol monobutyl ether, was obtained. 281.3 parts of the diglycidyl ether of Bisphenol A were then added and the temperature was reduced below 160° C. Acetone, 215.9 parts, was slowly added while letting the temperature drop to 52° C. Tris(2,3-dibromopropyl)phosphate, 4.92 parts, was then added and agitation was continued for 30 minutes. When complete solution was obtained, the resin solution was filtered through a filter press and stored.

To 62.5 grams of the resin solution were added 24.15 ml. of a solution made from 4 parts of dicyandiamide and 0.22 part of benzyldimethylamine in 44 parts of a 50/50 blend of dimethyl formamide and ethylene glycol monomethyl ether. After standing at room temperature for 6 hours, the sroke cure time at 340° F. (171° C.) was found to be 385–425 seconds.

EXAMPLE 4

To a suitable reactor were added 21,203 parts of the diglycidyl ether of Bisphenol A having an epoxide equivalent weight of 190. A nitrogen gas sparge was begun through the resin and heat was applied. When the temperature reached 121° C., 11,119 parts of 2,2'-bis(3,5-dibromo, 4-hydroxyphenyl) propane were added followed by 2.1 parts of a 45% solution of potassium hydroxide in water. The temperature was raised to 149° C., at which point the heat was adjusted so that the temperature lined out at 154°–160° C. The temperature was held at 154°–160° C. until the viscosity of the reactants, at 60% solids in diethylene glycol monobutyl ether, was U-V (Gardner-Holdt at 25° C.). Cooling was applied and 8,080 parts of acetone were slowly added. When a complete solution was obtained, the solution was filtered and stored. The resulting product had an epoxide equivalent weight, on solids basis, of 475, and a viscosity of 1,500 cps. at 25° C., and at 80% solids.

To 62.97 parts of the resin solution were added 24.15 parts of a hardener solution made from 4 parts of dicyandiamide, 44 parts of ethylene glycol monoethyl ether and 0.22 part of benzyldimethylamine. After standing for six hours at room temperature, the stroke cure time at 340° F. (191° C.) was found to be 240 to 244 seconds. This reaction demonstrates the reactivity rate of an epoxy resin cured with 4% dicyandiamide and 0.22% benzyldimethylamine with no reactivity retarder.

The stroke cure was repeated using 62.97 parts of the epoxy resin solution mixed with 24.15 parts of a curing agent solution made from 4 parts of dicyandiamide in 44 parts of ethylene glycol monomethyl ether and 0.11 part of benzyl dimethyl amine, half as much accelerator as above. After standing for 6 hours at room temperature, the stroke cure time was determined to be 295–297 seconds at 340° F.

The stroke cure time was then determined with no accelerator present. To 62.97 parts of the epoxy resin solution were added 24.15 parts of a curing agent solution made from 4 parts of dicyandiamide dissolved in 44 parts of ethylene glycol monomethyl ether. The stroke cure time at 340° F. was found to be 1020 seconds. The cured resin was soft and stringy and poorly cured compared to the resins which were cured with systems containing accelerators.

EXAMPLE 5

The epoxy resin solution described in Example 4 was divided into several equal portions. To each portion was added a phosphorus compound at 1 weight percent based on the weight of the epoxy resin in the solution. After standing 24 hours, resin-catalyst solutions were made by mixing 62.97 parts of the epoxy resin-phosphorus compound solutions with 24.15 parts of a solution of 4 parts of dicyandiamide and 0.22 part of benzyldimethylamine in 44 parts of ethylene glycol monomethyl ether. After standing for 6 hours at room temperature, the stroke cure times at 340° F. were determined with the following results.

Table III

| Phosphorus Compound | Cure Time sec. | Remarks |
| --- | --- | --- |
| Triethyl Phosphate | 452 | Excellent compatibility Tough cure |
| Triethyl Phosphite | 390–400 | Excellent compatibility |
| Dibutyl Phosphite | 406 | Excellent compatibility |
| Phosphorous Acid | 300–320 | Resin semi-gelled overnight without hardener |
| Triphenyl Phosphine Oxide | 260 | |

It is to be understood that the foregoing detailed description is given merely by way of illustration and that many variations may be made therein without departing from the spirit of the invention.

What is claimed is:

1. In a heat curable composition comprising a glycidyl polyether of a polyhydric phenol or polyhydric alcohol, dicyandiamide and a tertiary amine, the improvement which comprises the addition of a phosphorus compound in the amount of about 0.1 to about 2 weight percent based on the weight of the glycidyl polyether, wherein the phosphorus compound is represented by the formulas

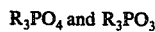

wherein each R, separately or combined, is hydrogen, or an alkyl, aryl, or haloalkyl radical, and wherein the alkyl group contains 1 to 20 carbon atoms, and the aryl group contains 6 to 18 carbon atoms.

2. The composition of claim 1 wherein the phosphorus compound is present in the amount of 0.1 to about 1.0 weight percent based on the weight of the glycidyl polyether.

3. The composition of claim 1 wherein the phosphorus compound is a trialkyl phosphate.

4. The composition of claim 1 wherein the phosphorus compound is a trialkyl phosphite.

5. The composition of claim 1 wherein the phosphorus compound is tris(2,3-dibromopropyl)phosphate.

6. A heat curable composition comprising a glycidyl polyether of a polyhydric phenol or polyhydric alcohol in admixture with dicyandiamide, a tertiary amine and a phosphorus compound wherein the phosphorus compound is represented by the formulas

$R_3PO_4$ and $R_3PO_3$ wherein each R, separately or combined, is hydrogen, or an alkyl, aryl or haloalkyl radical, wherein the alkyl group contains 1 to 20 carbon atoms and the aryl group contains 6 to 18 carbon atoms, wherein the phosphorus compound is present in the amount of about 0.1 to about 2 weight percent, the dicyandiamide is present in the amount of about 1 to about 10 weight percent and the tertiary amine is present in the amount of about 0.1 to about 1 weight percent, said weight percents being based on the weight of the glycidyl polyether.

7. The composition of claim 6 wherein the dicyandiamide is present in the amount of about 3 to about 5 weight percent, the tertiary amine is present in the amount of about 0.2 to about 0.3 weight percent, and the phosphorus compound is present in the amount of about 0.1 to about 1 weight percent.

8. The composition of claim 6 wherein the glycidyl polyether is a glycidyl polyether of a polyhydric phenol having an epoxide equivalent weight of 100 to 6000.

9. The composition of claim 8 wherein the epoxide equivalent weight is 170–2000.

10. The composition of claim 6 wherein the phosphorus compound is a trialkyl phosphate.

11. The composition of claim 6 wherein the phosphorus compound is a trialkyl phosphite.

* * * * *